(12) United States Patent
Bertsch et al.

(10) Patent No.: US 8,639,418 B2
(45) Date of Patent: Jan. 28, 2014

(54) MACHINE CONTROL SYSTEM WITH DIRECTIONAL SHIFT MANAGEMENT

(75) Inventors: Robert Paul Bertsch, Edwards, IL (US); Bruce Henry Hein, East Peoria, IL (US); Jeremy Joe Wilson, Peoria, IL (US); Timothy Allen Goldammer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1591 days.

(21) Appl. No.: 12/081,647

(22) Filed: Apr. 18, 2008

(65) Prior Publication Data

US 2009/0264252 A1    Oct. 22, 2009

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |

(52) U.S. Cl.
USPC ............ 701/50; 701/54; 477/107; 477/121; 123/319; 123/325

(58) Field of Classification Search
USPC ............ 701/50, 54; 477/107, 121; 123/319, 123/325, 329
See application file for complete search history.

(56) References Cited

U.S. PATENT DOCUMENTS

| | | | |
|---|---|---|---|
| 4,245,604 A | | 1/1981 | Lahiff |
| 4,259,723 A | * | 3/1981 | Fujisawa et al. ............... 701/102 |
| 4,276,863 A | * | 7/1981 | Sugasawa et al. ............ 123/481 |
| 4,344,399 A | | 8/1982 | Matsumura et al. |
| 4,375,207 A | * | 3/1983 | Sieber et al. ................... 123/333 |
| 4,593,581 A | * | 6/1986 | Omitsu ............................ 477/43 |
| 4,769,774 A | * | 9/1988 | Narita et al. ..................... 701/54 |
| 4,993,389 A | * | 2/1991 | Ahlborn et al. ................ 123/436 |
| 5,024,197 A | | 6/1991 | Nakamura |
| 5,199,326 A | | 4/1993 | Iwatsuki et al. |
| 5,235,946 A | | 8/1993 | Fodale et al. |
| 5,528,500 A | | 6/1996 | Al-Charif et al. |
| 5,725,064 A | * | 3/1998 | Ibaraki et al. .............. 180/65.26 |
| 5,836,851 A | | 11/1998 | Ruman |
| 5,863,277 A | | 1/1999 | Melbourne |

(Continued)

FOREIGN PATENT DOCUMENTS

| | | | | |
|---|---|---|---|---|
| CN | 101080972 | | 7/2002 | |
| EP | 155425 | A1 * | 9/1985 | .............. F02D 41/10 |

(Continued)

OTHER PUBLICATIONS

Gorman, Corey L., Anderson, Randall T., "System and Method for Integrated Power Control," U.S. Appl. No. 11/998,427, filed Nov. 30, 2007, 33 pages.

*Primary Examiner* — Khoi Tran
*Assistant Examiner* — Jaime Figueroa
(74) *Attorney, Agent, or Firm* — Finnegan, Henderson, Farabow, Garrett & Dunner LLP (57) ABSTRACT

A method is provided for operating a power system. The method includes receiving an operator request for a propulsion direction change. The method also includes directing power into a power source and reducing a supply of fuel to the power source while directing power into the power source. The method further includes basing a first threshold speed on a speed of the power source produced by directing power into the power source and increasing the supply of fuel to the power source when the speed of the power source falls below the first threshold speed.

16 Claims, 4 Drawing Sheets

(56) References Cited

U.S. PATENT DOCUMENTS

| | | |
|---|---|---|
| 5,951,258 A | 9/1999 | Lueschow et al. |
| 5,967,756 A | 10/1999 | Devier et al. |
| 6,086,510 A | 7/2000 | Kadota |
| 6,092,504 A * | 7/2000 | Barnes et al. ............... 123/357 |
| 6,422,972 B1 * | 7/2002 | Eguchi ........................ 477/107 |
| 6,549,839 B2 | 4/2003 | Katakura et al. |
| 6,634,984 B1 | 10/2003 | Doering et al. |
| 6,755,177 B2 * | 6/2004 | Woolford et al. ............ 123/333 |
| 6,810,853 B1 | 11/2004 | Wong et al. |
| 6,994,654 B2 | 2/2006 | Sakaguchi et al. |
| 7,104,924 B2 | 9/2006 | Hawkins |
| 7,115,065 B2 | 10/2006 | Tabata et al. |
| 7,160,223 B2 * | 1/2007 | Colvin ............................ 477/3 |
| 7,165,530 B2 | 1/2007 | Jensen et al. |
| 7,467,614 B2 * | 12/2008 | Stewart et al. ............ 123/198 F |
| 7,469,761 B2 * | 12/2008 | Kuras et al. .............. 180/65.245 |
| 7,877,183 B2 * | 1/2011 | Hoff et al. ...................... 701/51 |
| 7,957,880 B2 * | 6/2011 | Watabe et al. .................. 701/90 |
| 2001/0041644 A1 | 11/2001 | Yasuoka et al. |
| 2004/0209718 A1 * | 10/2004 | Ishibashi et al. ................ 474/18 |
| 2005/0109302 A1 * | 5/2005 | Tetsuno et al. ............. 123/179.5 |
| 2005/0154506 A1 * | 7/2005 | Takamatsu ......................... 701/1 |
| 2005/0274555 A1 * | 12/2005 | Betz et al. .................... 180/65.4 |
| 2006/0150767 A1 * | 7/2006 | Shah ........................... 74/730.1 |
| 2007/0137338 A1 * | 6/2007 | Nishi et al. ...................... 74/335 |
| 2007/0182251 A1 * | 8/2007 | Miyashita et al. ........... 307/10.6 |
| 2007/0213176 A1 * | 9/2007 | Fujii et al. .................... 477/107 |
| 2007/0251740 A1 * | 11/2007 | Betz et al. .................... 180/65.1 |
| 2008/0168964 A1 * | 7/2008 | Kimura et al. ................ 123/325 |
| 2008/0176708 A1 * | 7/2008 | Tamai et al. .................. 477/125 |
| 2009/0143946 A1 * | 6/2009 | Hoff et al. ....................... 701/51 |
| 2010/0174456 A1 * | 7/2010 | Beaudoin et al. ............... 701/51 |

FOREIGN PATENT DOCUMENTS

| | | |
|---|---|---|
| JP | 2005193811 | 7/2005 |
| JP | 2007092950 | 4/2007 |
| WO | 03060350 | 7/2003 |

* cited by examiner

MACHINE CONTROL SYSTEM WITH DIRECTIONAL SHIFT MANAGEMENT

TECHNICAL FIELD

The present disclosure is directed to a machine control system and, more particularly, to a machine control system with directional shift management.

BACKGROUND

During the operation of a machine, it may be desired to change the machine's direction of propulsion (i.e., forward or backward). When such a direction change is requested, a machine control system initially controls a power train to retard motion in the current direction. Typically, the retarding event is initiated by adjusting the transmission (e.g. downshifting) to drive power into the engine, thereby using parasitic losses to slow the machine down. Driving the power into the engine typically causes the engine speed to increase. If the engine is supplied with fuel during the retarding phase, the engine will generate power that can conflict with the power being dissipated. This may reduce the retarding capability of the engine. Therefore, during retarding events, the supply of fuel to the engine is reduced or cut off.

The retarding phase of the propulsion direction change event ends when the machine starts traveling in the opposite direction and the acceleration phase begins. During the acceleration phase, the transmission no longer directs power into the engine, and the parasitic losses cause the engine slow down. In addition, the control system places an acceleration load on the engine, which causes the engine to transfer to the transmission, any power absorbed during the retarding phase. This further contributes to the decrease in engine speed. To counter the decrease in engine speed and generate enough torque to meet the acceleration demand, the control system resumes or increases the supply of fuel to the engine. However, there is a delay between the resumption or increase of fuel and the generation of an adequate amount of torque to meet the acceleration demand. During this delay, the engine speed may continue to decline and may even fall below a minimum desired speed. Permitting the engine speed to fall below the desired minimum speed can adversely affect engine performance during a propulsion direction change event.

One method that has been employed to prevent the engine speed from falling below the minimum desired engine speed during a propulsion direction change event is disclosed in U.S. Pat. No. 4,769,774 (the '774 patent) issued to Narita et al. on Sep. 6, 1988. During a propulsion direction change event, the system disclosed in the '774 patent determines when the engine speed is accelerating and terminates fueling. As the propulsion direction change event is performed, the system continually monitors the vehicular speed and the engine speed. When the vehicle's ground speed approaches zero or the engine speed falls to a predetermined speed that is slightly greater than the engine's stall speed, the system resumes fueling. This allows the control system to resume fueling before the vehicle is propelled in the opposite direction.

Although the system disclosed in the '774 patent resumes fueling before any acceleration in the opposite direction occurs, improvements to engine performance may be limited. In particular, the control system utilizes only one predetermined threshold speed for triggering the resumption of fueling to prevent the engine speed from falling below a minimum desired speed. However, such a threshold may not be effective for all propulsion direction change events because the load placed on the engine during the acceleration phase varies from direction change event to direction change event. Increased loads may cause greater delays between the resumption of fueling and the generation of adequate torque to meet the load. This is because it may take longer to generate greater amounts of torque. In contrast smaller loads may cause minimal delays between the resumption of fueling and the generation of adequate torque to meet the load.

The disclosed system is directed to overcoming one or more of the problems set forth above.

SUMMARY

In one aspect, the present disclosure is directed toward a method for operating a power system. The method includes receiving an operator request for a propulsion direction change. The method also includes directing power into a power source and reducing a supply of fuel to the power source while directing power into the power source. The method further includes basing a first threshold speed on a speed of the power source produced by directing power into the power source and increasing the supply of fuel to the power source when the speed of the power source falls below the first threshold speed.

Consistent with a further aspect of the disclosure, a power system is provided. The power system includes a power source operably coupled to a transmission. The power system also includes at least one operator interface device, each operator interface device being configured to generate an operator request. The power system further includes a controller. The controller is configured to, in response to an operator request for a propulsion direction change, cause the transmission to direct power into the power source. The controller is also configured to, in response to an operator request for a propulsion direction change, reduce a supply of fuel to the power source while the transmission directs power into the power source. The controller is further configured to, in response to an operator request for a propulsion direction change, base a first threshold speed on a speed of the power source produced by power directed into the power source. In addition, the controller is configured to, in response to an operator request for a propulsion direction change, increase the supply of fuel to the power source when the speed of the power source falls below the first threshold speed.

DETAILED DESCRIPTION

Figure 1:
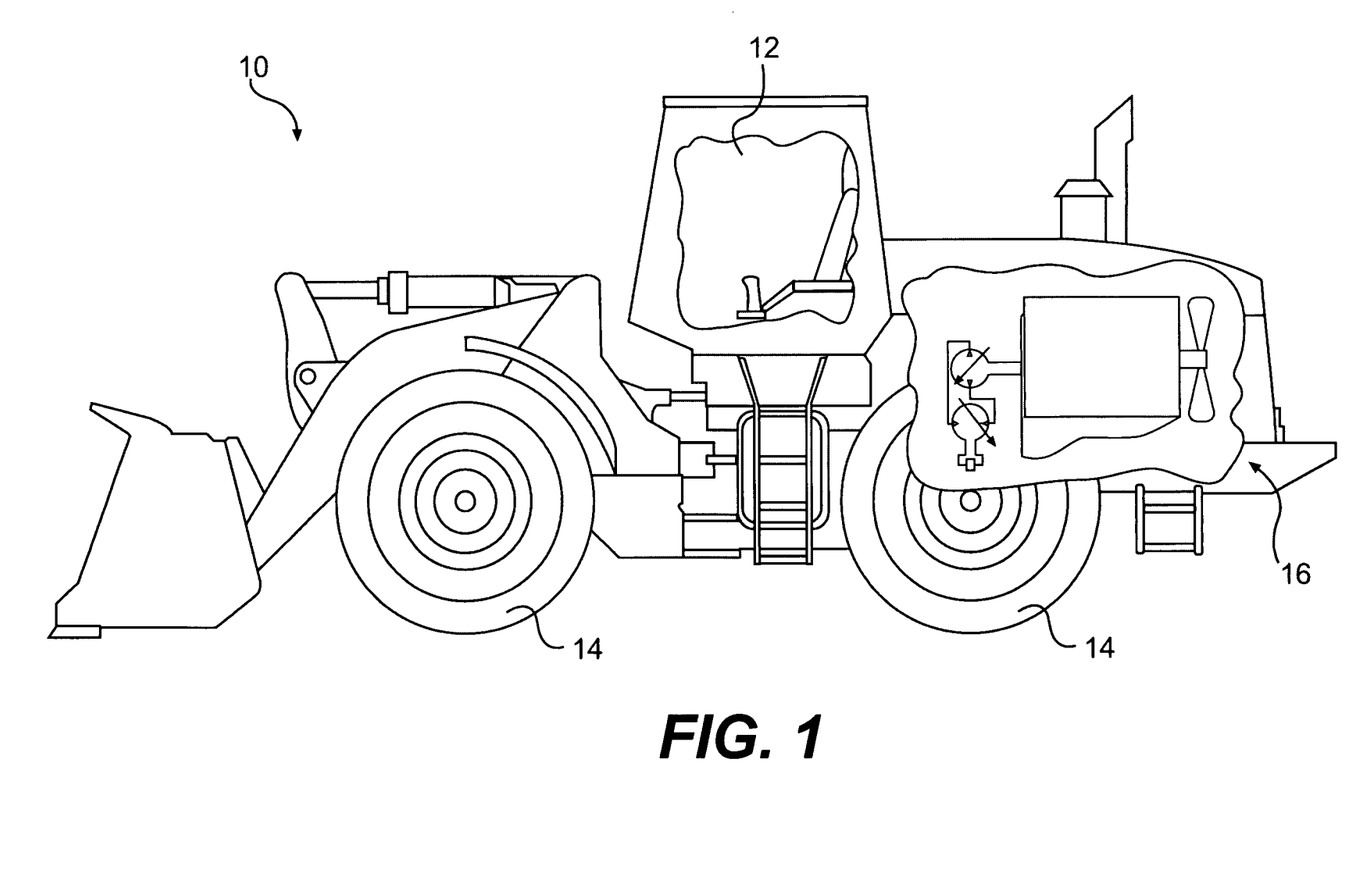
FIG. 1 is an illustration of an exemplary machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power system 16 for driving at least one of traction devices 14.

Figure 2:
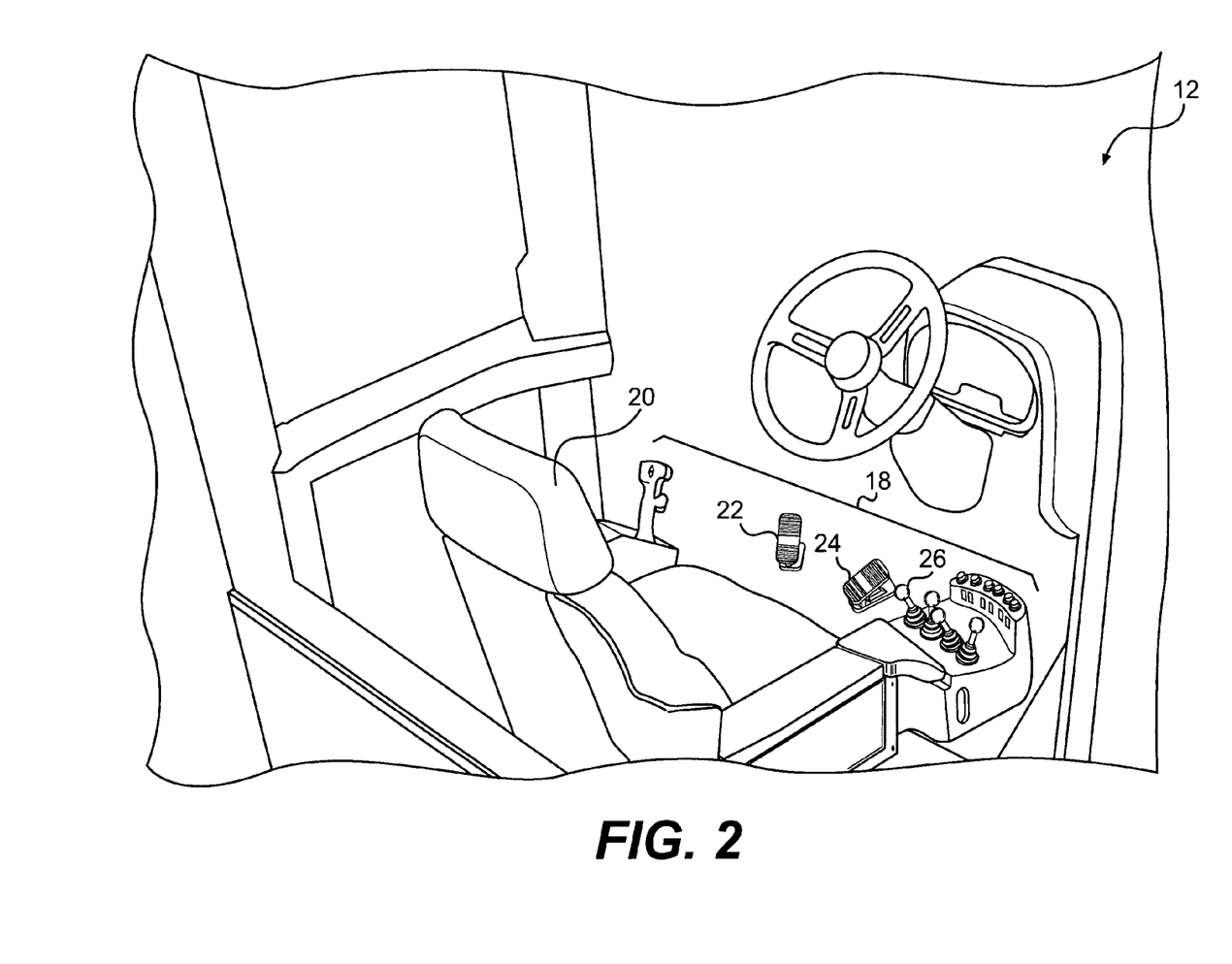
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing displacement signals that are indicative of a desired machine maneuver. In one embodiment, operator interface devices 18 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may expect and affect a corresponding machine travel movement. In addition, as the operator moves FNR selector 26 to a forward, reverse, or neutral position, the operator may affect a corresponding transmission operating mode such as, for example, forward, reverse, or idle. It is contemplated that operator interface devices other than foot pedals such as, for example, joysticks, levers, switches, knobs, wheels, and other devices known in the art, may additionally or alternatively be provided within operator station 12 for travel control of machine 10, if desired. Furthermore, FNR selector 26 may be omitted and other operator input devices may affect the transmission operating mode.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
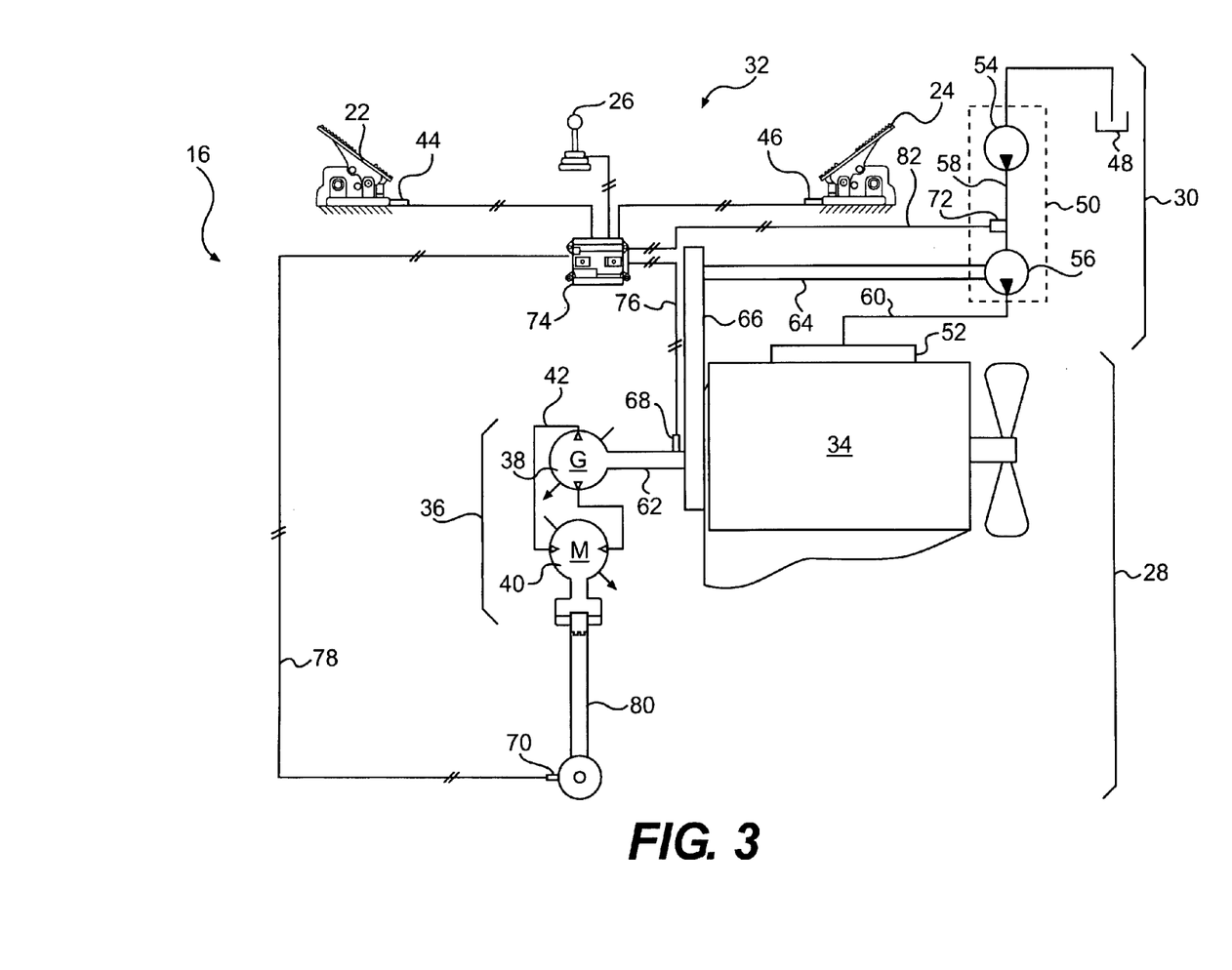
FIG. 3 is a diagrammatic illustration of an exemplary disclosed power system of the machine of FIG. 1.

As illustrated in FIG. 3, power system 16 may drive traction devices 14 (referring to FIG. 1) in response to various operator and environmental inputs. Power system 16 may include a power train 28, a fuel system 30, and a control system 32 for regulating the operation of power system 16 in response to one or more inputs.

Power train 28 may be an integral package configured to generate and transmit power to traction devices 14. In particular, power train 28 may include a power source 34 operable to generate a power output and a transmission 36 connected to transmit the power output in a useful manner to traction devices 14 (referring to FIG. 1)

Power source 34 may include an internal combustion engine having multiple subsystems that cooperate to produce mechanical or electrical power output. For the purposes of this disclosure, power source 34 is depicted and described as a four-stroke diesel engine. One skilled in the art will recognize, however, that power source 34 may be any other type of internal combustion engine such as, for example, a gasoline or a gaseous fuel-powered engine. The subsystems included within power source 34 may include, for example, an air induction system, an exhaust system, a lubrication system, a cooling system, or any other appropriate system.

Transmission 36 may embody, for example, a continuously variable transmission (CVT). Transmission 36 may be any type of continuously variable transmission such as, for example, a hydraulic CVT, a hydro-mechanical CVT, an electric CVT, or other configuration as would be apparent to one skilled in the art. In addition, transmission 36 may include a driving element 38 and a driven element 40.

In the exemplary electric CVT of FIG. 3, driving element 38 may be a generator, such as an alternating field-type generator, and driven element 40 may be an electric motor, such as an alternating field-type motor configured to receive power from driving element 38. The generator of driving element 38 may be connected to drive the motor of driven element 40 with electric current via power electronics 42 in response to a torque command directed to driven element 40. In some situations, the motor of driven element 40 may alternatively drive the generator of driving element 38 via power electronics 42. It is contemplated that, in embodiments utilizing a hydraulic continuously variable transmission, driving element 38 may be a pump, such as a variable displacement pump, and driven element 40 may be a motor, such as a variable displacement motor. Driven element 40 may be fluidly connected to driving element 38 by conduits that supply and return fluid to and from driving element 38 and driven element 40, allowing driving element 38 to effectively drive driven element 40 by fluid pressure.

Power electronics 42 may include generator associated components and motor associated components. For example, power electronics 42 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 38 and driven element 40. Other components that may be associated with the drive inverter include power supply circuitry, signal conditioning circuitry, and solenoid driver circuitry, among others. In addition, power electronics 42 may include a generator heat sink (not shown), and a motor heat sink (not shown) in communication with driving element 38 and driven element 40, respectively. Each heat sink may absorb heat from their respective components of power electronics 42 and transfer this heat to a cooling system (not shown)

Transmission 36 may be at least partially controlled with left and right foot pedals 22 and 24. That is, as left and right foot pedals 22 and 24 are manipulated by an operator, the foot pedals may provide electric signals signifying a desired driven element output such as, for example, a desired torque output and/or a desired speed limit. For example, left and right foot pedals 22 and 24 may have a minimum position and be movable through a range of positions to a maximum position. Sensors 44 and 46 may be provided in association with each of left and right foot pedals 22 and 24, respectively, to sense the displacement positions thereof and produce corresponding signals responsive to the displaced positions. Sensors 44 and 46 may be any sensor capable of sensing the displacement of foot pedals 22 and 24 such as, for example, a switch or potentiometer. The displacement signals from each of sensors 44 and 46 may be directed through control system 32 to transmission 36 to control the torque output of driven element 40.

Fuel system 30 may include components that cooperate to deliver injections of pressurized fuel into each combustion chamber (not shown) of power source 34. Specifically, fuel system 30 may include a tank 48 configured to hold a supply of fuel and a fuel pumping arrangement 50 configured to pressurize the fuel and direct the pressurized fuel to a plurality of fuel injectors (not shown) by way of a common rail 52.

Fuel pumping arrangement 50 may include one or more pumping devices that function to increase the pressure of the fuel and direct one or more pressurized streams of fuel to common rail 52. In one example, fuel pumping arrangement 50 may include a low pressure source 54 and a high pressure source 56 disposed in series and fluidly connected by way of a fuel line 58. Low pressure source 54 may be a transfer pump configured to provide low pressure feed to high pressure source 56. High pressure source 56 may be configured to receive the low pressure feed and to increase the pressure of the fuel. High pressure source 56 may be connected to common rail 52 by way of a fuel line 60. A check valve (not shown) may be disposed within fuel line 60 to provide for unidirectional flow of fuel from fuel pumping arrangement 50 to common rail 52.

One or both of low and high pressure sources 54, 56 may be operably connected to power source 34 and driven by a crankshaft 62 associated with power source 34. Low and/or high pressure sources 54, 56 may be connected with crankshaft 62 in any manner readily apparent to one skilled in the art where a rotation of crankshaft 62 may result in a corresponding rotation of a pump drive shaft. For example, a pump driveshaft 64 of high pressure source 56 may be connected to crankshaft 62 through a gear train 66. It is contemplated; however, that one or both of low and high pressure sources 54, 56 may alternatively be driven electrically, hydraulically, pneumatically, or in any other appropriate manner.

Control system 32 may regulate the operation of power system 16 and may include sensors 68, 70, and 72 for sensing various parameters indicative of engine speed, transmission output, and fueling rate, respectively. Control system 32 may also include a controller 74 for regulating the operation of power system 16 in response to operator requests, environmental inputs, and signals received from sensors 68, 70, and 72. It is contemplated that control system 32 may include additional sensors for sensing other parameters that may be useful for operation of power system 16.

Sensor 68 may be associated with power source 34 to sense an output speed thereof and may be in communication with controller 74 via a communication line 76. In one example, sensor 68 may embody a magnetic pickup type of sensor associated with a magnet embedded within a rotational component of power train 28 such as crankshaft 62 or a flywheel. During operation of power source 34, sensor 68 may sense the rotating magnetic field produced by the magnet and generate a signal corresponding to the rotational speed of power source 34.

Sensor 70 may be associated with transmission 36 and/or traction device 14 (referring to FIG. 1) to sense an output of transmission 36 and/or a travel speed of machine 10 and may be in communication with controller 74 via a communication line 78. In one example, sensor 70 may embody a magnetic pickup type of sensor associated with a magnet embedded within a rotational component of power train 28 such as a transmission output shaft 80. During operation of machine 10, sensor 70 may sense the rotating magnetic field produced by the magnet and generate a signal corresponding to the rotational speed of transmission 36 and/or the corresponding travel speed of machine 10.

Sensor 72 may be associated with fuel system 30 to sense a flow rate of fuel being supplied to power source 34 and may be in communication with controller 74 via a communication line 82. In one embodiment, sensor 72 may be a fuel flow sensor located in or near fuel system 30 to monitor a flow rate of fuel being sprayed into the combustion chambers (not shown) of power source 34. It is contemplated that sensor 72 may be any other type of sensor capable of sensing a parameter indicative of a rate of fuel entering power source 34.

Controller 74 may regulate the operation of power system 16 in response to operator requests, environmental inputs, and signals received from sensors 68, 70, and 72. The operator requests may include magnitude of propulsion, direction of propulsion (i.e., forward or reverse), vehicular speed, output torque, or any other request that may affect the operation of power train 28. A plurality of maps, algorithms, charts, graphs, etc. may be stored in the memory of controller 74 for interpreting various signals indicative of the operator's request. Such signals may be received from FNR selector 26, sensors 44, 46, and/or any other operator interface device 18. Upon determining the operator request, controller 74 may receive additional input from sensors 68, 70, and 72 and/or may receive environmental data to determine a course of action for operating power system 16.

An exemplary operator request may be a propulsion direction change of machine 10. The operator may initiate such a request by actuating various operator interface devices 18. Controller 74 may receive signals from the actuated interface devices 18 and compare the signals to the above disclosed maps, algorithms, charts, and graphs. The comparison may cause controller 74 to determine that the operator may be requesting a propulsion direction change. Upon such a determination, controller 74 may switch from a current operating mode to a propulsion direction change mode.

While operating in the propulsion direction change mode, controller 74 may cause transmission 36 to direct power to power source 34. Such power may be dissipated through rotational movement of a crankshaft (not shown) of power source 34. Thus, as power may be dissipated through power source 34, the power source speed may increase. If power source 34 were to be supplied with fuel during the retarding phase of the propulsion direction change event, power source 34 may be caused to generate power, which may further increase the rotational speed of the crankshaft. This may increase the power source speed to levels that may be harmful to power source 34. In addition, the generated power may conflict with the power being dissipated to retard the current propulsion of machine 10, thereby reducing the retarding capability of power source 34. Thus, it may be desired to reduce or cut off the supply of fuel to power source 34 during the retarding phase of the propulsion direction change event.

Transmission 36 may continue dissipating power through power source 34 until machine 10 may reach a ground speed of approximately zero and the retarding phase of the propulsion change event may end. Without power being directed into power source 34, the parasitic losses may cause the power source speed to decline. In addition, as the acceleration phase begins, controller 74 may place an acceleration load on power source 34, thereby causing power source 34 to transfer to transmission 36, any power remaining from the retarding phase. This may further contribute to the decrease in power source speed. When the power source speed may fall to a first threshold speed, controller 74 may resume the supply of fuel to power source 34 and may begin generating torque to meet the acceleration demand. However, there may be a delay between the resumption of fuel and the generation of an adequate amount of torque to meet the acceleration demand. During this delay, the power source speed may continue to decline. If the power source speed were to fall below a minimum desired speed, the performance of power source 34 may be compromised. The minimum desired speed may be any speed such as, for example, a high idle speed, a low idle speed, a stall speed, or any other power source speed.

To prevent the power source speed from falling below the minimum desired speed, the first threshold power source speed at which fueling may be resumed may be set higher than the minimum desired speed of power source 34. Setting the first threshold to a higher speed may cause the resumption of fueling to occur earlier in the propulsion direction change event and may give power source 34 enough time to generate an adequate toque output. The magnitude of power source speeds encountered during the retarding phase may be indicative of acceleration loads encountered during the acceleration phase. Therefore, the first threshold may be set to a speed based on a maximum power source speed encountered during the retarding phase. For example, if the maximum power source speed encountered during the retarding phase is approximately 2200 rpm, the first threshold may be set to approximately 2200 rpm. The resumption of fueling when the power source speed falls below approximately 2200 rpm may permit power source 34 to resume fueling early enough to generate an adequate torque output to meet the acceleration load and prevent the power source speed from falling below the minimum desired speed.

For some propulsion change events, the acceleration load imposed on power source 34 may be low enough for the delays between the resumption of fueling and the generation of adequate torque to be minimal. Under these circumstances, it may be desired to set the first threshold speed to the minimum desired power source speed. For example, if the minimum desired speed of power source 34 is approximately 1800 rpm, power source speeds up to approximately 1950 rpm may precede acceleration loads that may be small enough for the delays between the resumption of fueling and the generation of adequate torque to be minimal. Therefore, it may be desired to set a second threshold to approximately 1950 rpm. If power source speeds occurring during the retarding phase do not exceed the second threshold, the first threshold may be set to the minimum desired power source speed.

Controller 74 may embody a single microprocessor or multiple microprocessors for controlling the operation of power system 16 in response to various received signals. Numerous commercially available microprocessors can be configured to perform the functions of controller 74. It should be appreciated that controller 74 could readily embody a general machine microprocessor capable of controlling numerous machine functions. Controller 74 may include a memory, a secondary storage device, a processor, and any other components for running an application. Various other circuits may be associated with controller 74 such as power supply circuitry, signal conditioning circuitry, solenoid driver circuitry, and other types of circuitry.

Figure 4:
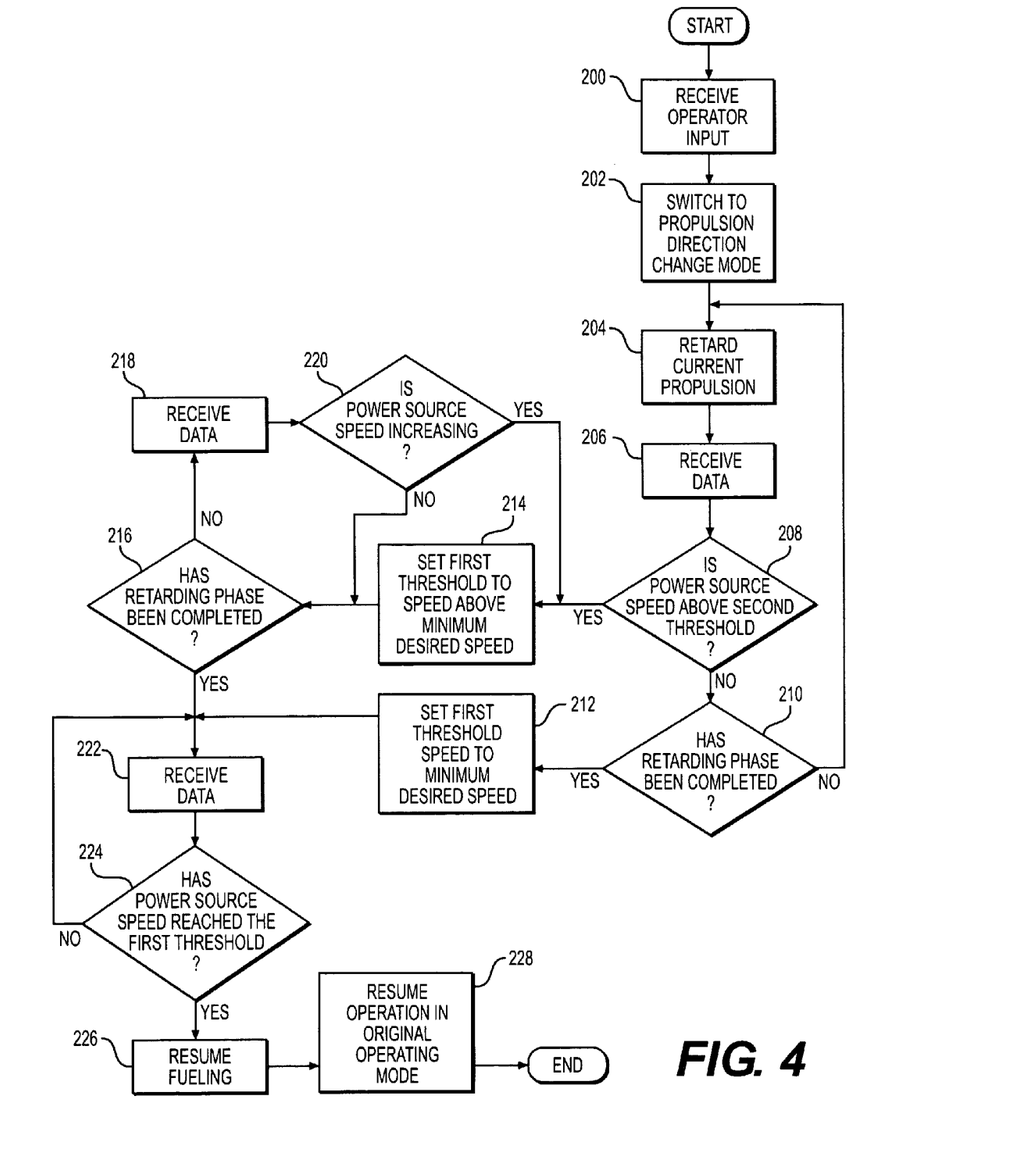
FIG. 4 is a flow diagram illustrating an exemplary method for operating the power system of FIG. 3.

FIG. 4 illustrates an exemplary method of controlling power system 16. In particular, FIG. 4 is a flow chart representing an exemplary method for engaging and operating in the propulsion direction change mode. FIG. 4 will be discussed further in the following section to better illustrate the disclosed system and its operation.

Industrial Applicabilty

The disclosed power system may improve the performance of a power source during propulsion direction change events. In particular, the disclosed system may adjust a threshold power source speed at which fueling may be resumed during an acceleration phase of the propulsion direction change event. The threshold power source speed may be adjusted so that the resumption of fueling may occur early enough in the propulsion direction change event to generate enough torque to prevent the speed of the power source from falling below a minimum desired speed. Preventing the power source speed from falling below the minimum desired speed may improve the performance of the power source and reducing the length of time needed to perform the change of direction event. The method for changing a direction of propulsion will be described below.

As illustrated in FIG. 4, the method may begin when controller 74 receives input from the operator indicative of a desire to change the direction of propulsion (step 200). For example, if machine 10 is being propelled in a forward direction, the operator may desire to change the propulsion direction and begin propelling machine 10 in a reverse direction. Such signals may be generated when the operator manipulates one or more operator interface devices 18. For example, the operator may cause signals to be generated by manipulating left pedal 22, right pedal 24, and/or FNR selector 26.

Upon receiving the signal indicative of changing the direction of propulsion, controller 74 may switch from a current operating mode to a propulsion direction change mode (step 202). After switching to the propulsion direction change mode, controller 74 may cause transmission 36 to retard propulsion in the current direction machine 10 may be traveling (step 204). This may be performed by directing power to power source 34, thereby using parasitic losses to retard the propulsion. It should be understood that continuing to fuel power source 34 may cause power source 34 to generate power. This generated power may conflict with the power being driven into power source 34, thereby offsetting or reducing the parasitic losses being used to retard the current propulsion of machine 10. Therefore, controller 74 may reduce or terminate the fueling of power source 34 during the retarding phase of the propulsion direction change event.

While power source 34 may be dissipating power, controller 74 may receive signals from sensor 68 indicative of a speed of power source 34 (step 206). It is alternatively contemplated that controller 74 may receive signals from other sensors relating to various parameters of machine 10 that may indicate power source speed, if desired. The magnitude of the power source speed may affect how controller 74 may operate power system 16 during the propulsion direction change event. For example, controller 74 may operate power system 16 to maintain the power source speed above a minimum desired speed. The minimum desired speed may be, for example, a high idle speed, a low idle speed, a stall speed, or any other power source speed.

For some propulsion direction change events, the acceleration demand placed on power system 16 during the acceleration phase may place such a large load on power source 34 that there might be a significant delay between the resumption of fueling and the generation of an adequate torque output. This delay may allow the power source speed to fall below the first threshold if controller 74 does not take preventative action. Therefore, it may be desired to set a first threshold speed at which fueling may be resumed to a speed above the minimum desired speed. This may cause controller 74 to resume fueling power source 34 earlier in the propulsion direction change event and give power source 34 enough time to generate an adequate torque output. However, the acceleration demand for other propulsion direction change events may be low enough that the delay between the resumption of fueling and the generation of an adequate torque output may be minimal. For these direction change events, it may be desired to set the first threshold speed to the same speed as the minimum desired speed. For example, if the minimum desired speed is approximately 1800 rpm, the delay between the fueling of power source 34 and the generation of an adequate torque output may be minimal when the speed of power source 34 does not exceed approximately 1950 rpm during the retarding phase.

In order to determine whether or not to set the first threshold to the minimum desired speed, controller 74 may determine whether the power source speed has exceeded a second threshold speed (step 208). The second threshold speed may be the maximum power source speed encountered during the retarding phase of the propulsion direction change event that may correspond to a minimal delay between the resumption of fueling and the generation of an adequate torque output. For example, for a minimum desired speed of approximately 1800 rpm, the second threshold speed may be approximately 1950 rpm.

If controller 74 determines that the power source speed has not exceeded the second threshold speed (step 208: No), controller 74 may determine whether or not the retarding phase of the propulsion direction change event may be completed (step 210). Such a determination may be made via any number of methods. For example, because the retarding phase may be completed when the ground speed of machine 10 may reach approximately zero, the determination may be based upon whether or not the ground speed of machine 10 may have reached approximately zero.

The determination as to whether or not the retarding phase has been completed may be made to ascertain whether or not it may still be possible for the power source speed to exceed the second threshold speed. For example, if the retarding phase is not complete and the power source speed has not exceeded the second threshold, it may still be possible for the power source speed to exceed the second threshold speed. Thus, if controller 74 determines that the retarding phase has not been completed (step 210: No), step 204 may be repeated (i.e., controller 74 may continue to retard propulsion in the current direction machine 10 may be traveling). However, if controller 74 determines that the retarding phase is complete (step 210: Yes), controller 74 may set the first threshold to the minimum desired speed (step 212).

If, during the performance of step 208, controller 74 determines that the power source speed has exceeded the second threshold (step 208: Yes), controller 74 may set the first threshold to a speed above the minimum desired speed (step 214). The speed at which the first threshold may be set may be any speed that may prevent the power source speed from falling below the minimum desired speed during the acceleration phase of the propulsion direction change event. For example, the first threshold speed may be set to the maximum power source speed encountered during the retarding phase.

After raising the first threshold, controller 74 may determine whether or not the retarding phase has been completed (step 216). Such a determination may be made via any number of methods. For example, because the retarding phase may be completed when the ground speed of machine 10 may reach approximately zero, the determination may be based upon whether or not the ground speed of machine 10 may have reached approximately zero.

The determination as to whether or not the retarding phase has been completed may be made to ascertain whether or not it may still be possible for the power source speed to continue increasing. Any increase in power source speed may affect the speed at which the first threshold may be set. Thus, if controller 74 determines that the retarding phase has not been completed (step 216: No), controller 74 may continue retarding the current propulsion of machine 10 and receiving signals from sensor 68 indicative of a speed of power source 34 (step 218).

After receiving the signals, controller 74 may determine whether the power source speed is increasing (step 220). If controller 74 determines that the power source speed is increasing (step 220: Yes), step 214 may be repeated (i.e., controller 74 may set the first threshold to a speed above the minimum desired speed such as, for example, the maximum power source speed encountered during the retarding phase). However, if controller 74 determines that the power source speed is not increasing (step 220: No), step 216 may be repeated (i.e., controller 74 may determine whether or not the retarding phase has been completed).

Once the retarding phase is complete, transmission 36 may stop directing power into power source 34, and the parasitic losses may cause the power source speed to decline. In addition, as the acceleration phase begins, controller 74 may place an acceleration load on power source 34, thereby causing power source 34 to transfer to transmission 36, any power remaining from the retarding phase. This may further contribute to the decrease in power source speed. Therefore, if controller 74 determines that the retarding phase has been completed (step 216: Yes) or after performing step 212 (i.e., setting the first threshold to the minimum desired speed), controller 74 may receive signals from sensor 68 indicative of a speed of power source 34 (step 222).

Controller 74 may analyze the sensed power source speed and determine whether the power source speed has reached the first threshold (step 224). If controller 74 determines that the power source speed has not reached the first threshold (step 224: No), step 222 may be repeated (i.e., controller 74 may continue receiving signals from sensor 68 indicative of a speed of power source 34). However, if controller 74 determines that the power source speed has reached the first threshold speed (step 224: Yes), controller 74 may resume fueling power source 34 (step 226). After resuming fueling power source 34, controller 74 may resume operation in the original operating mode in which controller 74 was operating before switching to the propulsion direction change mode (step 228). Once resuming operation in the original operating mode, the method may be terminated.

Adjusting the threshold at which fueling may be resumed may improve engine performance for a wide variety of propulsion direction change events. In particular, by basing the threshold on power source speeds encountered during the retarding phase of the propulsion direction change event, the speed of the power source may be prevented from falling below a minimum desired speed for a wide variety of acceleration loads that may be experienced when performing different propulsion direction change events. Preventing the power source speed from falling below the minimum desired speed may improve the power source performance.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A method for operating a power system, comprising:
   receiving an operator request for a propulsion direction change;
   directing power into a power source;
   reducing a supply of fuel to the power source while directing power into the power source;
   basing a first threshold speed on a speed of the power source produced by directing power into the power source;
   increasing the supply of fuel to the power source when the speed of the power source falls below the first threshold speed,
   when the power source speed produced by directing power into the power source exceeds a second threshold speed, setting the first threshold speed above a minimum speed, and
   when the power source speed produced by directing power into the power source does not exceed the second threshold speed, setting the first threshold speed to the minimum speed, wherein at least one of the preceding steps is performed by a processor.

2. The method of claim 1, further including:
when the power source speed produced by directing power into the power source exceeds the second threshold speed, setting the first threshold speed to a maximum power source speed produced by directing power into the power.

3. The method of claim 1, further including terminating the supply of fuel to the power source while directing power into the power source and resuming the supply of fuel to the power source when the speed of the power source falls below the first threshold speed.

4. The method of claim 1, wherein the minimum speed is a high idle speed of the power source.

5. The method of claim 1, wherein the minimum speed is a low idle speed of the power source.

6. A power system, comprising:
a power source operably coupled to a transmission;
at least one operator interface device, each operator interface device being configured to generate an operator request; and
a controller configured to, in response to an operator request for a propulsion direction change:
cause the transmission to direct power into the power source;
reduce a supply of fuel to the power source while the transmission directs power into the power source;
base a first threshold speed on a speed of the power source produced by power directed into the power source;
increase the supply of fuel to the power source when the speed of the power source falls below the first threshold speed,
set the first threshold speed above a minimum when the power source speed produced by power direct into the power source exceeds a second threshold speed, and
set the first threshold speed to the minimum speed when the power source speed produced by directed into the power source does not exceed the second threshold speed.

7. The power system of claim 6, wherein the controller is further configured to:
set the first threshold speed to a maximum power source speed produced by power directed into the power source when the power source speed produced by power directed into the power source exceeds the second threshold speed.

8. The power system of claim 6, wherein the controller is further configured to terminate the supply of fuel to the power source while directing power into the power source and resume the supply of fuel to the power source when the speed of the power source falls below the first threshold speed.

9. The power system of claim 6, wherein the minimum speed is a high idle speed of the power source.

10. The power system of claim 6, wherein the minimum speed is a low idle speed of the power source.

11. A machine, comprising:
at least one traction device;
a power source operably coupled to a transmission to power the at least one traction device;
at least one operator interface device, each operator interface device being configured to generate an operator request; and
a controller configured to, in response to an operator request for a propulsion direction change:
cause the transmission to direct power into the power source;
reduce a supply of fuel to the power source while the transmission directs power into the power source;
base a first threshold speed on a speed of the power source produced by power directed into the power source;
increase the supply of fuel to the power source when the speed of the power source falls below the first threshold speed, and
set the first threshold speed when the power source speed produce by power directed into the power source does not exceed a second threshold speed.

12. The machine of claim 11, wherein the controller is further configured to set the first threshold speed above a minimum speed when the power source speed produced by power directed into the power source exceeds a second threshold speed.

13. The machine of claim 11, wherein the controller is further configured to set the first threshold speed to a maximum power source speed produced by power directed into the power source when the power source speed produced by power directed into the power source exceeds a second threshold speed.

14. The machine of claim 13, wherein the controller is further configured to terminate the supply of fuel to the power source while directing power into the power source and resume the supply of fuel to the power source when the speed of the power source falls below the first threshold speed.

15. The machine of claim 11, wherein the minimum speed is one of a high idle speed of the power source or a low idle speed of the power source.

16. The method of claim 1, wherein basing the first threshold speed on the speed of the power source produced by directing power into the power source comprises selecting either a first threshold speed or a second threshold speed, based on the speed of the power source produced by directing power into the power source.

* * * * *